United States Patent [19]

Lee et al.

[11] 4,113,076

[45] Sep. 12, 1978

[54] INTERRELATED CONTROLS FOR VEHICLE BRAKES, TRANSMISSION AND MOTOR

[75] Inventors: Arthur L. Lee; Arthur B. Coval, both of Columbus, Ohio

[73] Assignee: A. L. Lee Corporation, Columbus, Ohio

[21] Appl. No.: 702,396

[22] Filed: Jul. 6, 1976

[51] Int. Cl.² ............................................. B60K 29/00
[52] U.S. Cl. .................................. 192/4 A; 192/2; 74/843; 188/106 P
[58] Field of Search .......................... 192/4 A; 74/846

[56] References Cited

U.S. PATENT DOCUMENTS

| | | | |
|---|---|---|---|
| 2,200,878 | 5/1940 | Farris | 192/13 A |
| 2,690,533 | 9/1954 | Marco | 192/2 X |
| 2,968,967 | 1/1961 | Ross | 192/4 A X |
| 3,235,042 | 2/1966 | Ulinski | 192/2 |
| 3,589,484 | 6/1971 | Lammers | 192/4 A |
| 3,854,559 | 12/1974 | Talak | 192/4 A |
| 3,978,946 | 9/1976 | Ream | 192/4 A |

*Primary Examiner*—Benjamin W. Wyche
*Attorney, Agent, or Firm*—Stanley J. Price, Jr.; John M. Adams

[57] ABSTRACT

A motor drives a pump to provide fluid under pressure in a closed hydraulic circuit through a pilot valve to a change speed clutch valve and a directional valve of a multi-speed transmission for an electrically powered vehicle, such as a mine haulage vehicle. The multi-speed transmission is connected by an output shaft to the driven wheels of the vehicle. A braking force is applied to the driven wheels by a hydraulically operated service brake to effect routine stopping of the vehicle. Under emergency conditions an emergency brake applies a braking force to the driven wheels by operation of a panic bar positioned in the operator's compartment. A brake valve connected to the panic bar maintains a preselected fluid pressure in the hydraulic circuit of the emergency brake to retain the brake in a released position. The hydraulic circuit is interlocked through the pilot valve to the transmission clutch and direction valves. Depressing the panic bar actuates the brake valve to release the emergency brake and simultaneously actuate the pilot valve to interrupt fluid flow to the respective valves of the transmission. Transmission of power to the driven wheels is terminated, and the vehicle is stopped. Actuation of the panic bar also opens the main contactors of the electrical controller that supplies electrical power to the traction motors. Upon application of the emergency brake, the traction motors must be restarted before the vehicle can be moved, and a lever of the brake valve must be shifted from the park to run position. Thus, the emergency brake is confined to emergency use only and is not to be used as a service brake to provide less wear to preserve the emergency brake for emergency use.

6 Claims, 2 Drawing Figures

INTERRELATED CONTROLS FOR VEHICLE BRAKES, TRANSMISSION AND MOTOR

BACKGROUND OF THE INVENTION

1. Field of the Invention

This invention relates to a brake system for an automotive vehicle and a method of operation thereof and more particularly to a brake system adapted for use on a mine haulage vehicle in which a hydraulically controlled emergency brake is interlocked with the transmission of power to the driven wheels so that application of the emergency brake interrupts the transmission of power to the driven wheels requiring the operator to restart the vehicle before it can be moved.

2. Description of the Prior Art

In underground mining operations, mine haulage vehicles commonly known as "shuttle cars" are employed to transfer loose material dislodged from the mine face rearwardly to a discharge point where the material is transferred onto a conveyor belt that transports the material from the mine. The shuttle car may be electrically driven such as by A.C. or D.C. electric motors or propelled by a diesel engine. A fluid actuated braking system incorporated within a closed hydraulic circuit on the vehicle is operable to apply a braking force to the driven wheels of the vehicle. The braking system is utilized as a service brake on a routine stop, start basis and is actuated in a conventional manner, as by a foot pedal, to energize a master cylinder that pressurizes a conduit to supply fluid to the brakes. The brakes frictionally engage the driven wheels to slow the vehicle or bring the vehicle to a stop.

Operation of the service brakes requires a continuous supply of pressurized fluid. A malfunction of the master cylinder or fluid pumps that generate the required hydraulic pressure may render the service brake inoperable. Therefore, an emergency brake is provided for bringing the vehicle to a stop.

It is the conventional practice to actuate the emergency brake through an operator controllable member, such as a panic bar, positioned in the operator's compartment of the vehicle. Depressing the panic bar releases the hydraulic pressure in the hydraulic circuit that maintains the emergency brakes in a normally de-energized state. Thus, removal of hydraulic pressure from the emergency brake actuates the brake to bring the vehicle to a stop. The practice of actuating the emergency brake through the convenience of a panic bar invites the operator to utilize the emergency brake on a routine basis as a replacement for the service brake. Consequently, the emergency brake is subjected to excessive wear. Such misuse of the emergency brake on a routine basis decreases the overall effectiveness of the emergency brake possibly rendering the emergency brake inoperable in emergency situations.

Another problem encountered with conventional emergency brakes of an electrically powered shuttle car is the loss of brake release pressure or inadequate pressure for release of the emergency brakes which occurs as a result of pump failure or electrical power failure. In the event there is inadequate pressure for brake release or a total loss of pressure for brake release, the emergency brake remains engaged when tramming of the vehicle is resumed. This subjects the emergency brake to undesirable wear. Furthermore, the application of the emergency brake requires excessively high fluid pressure in the control circuit. The operator must raise the fluid pressure in the control circuit or monitor the control circuit for leaks to assure that the pressure does not gradually diminish and result in unintended brake application, which may be partial or total. In many instances it is desirable to maintain the vehicle immovable while performing such operations as unloading the boom and running the conveyor to unload while the vehicle is positioned on an unloading ramp. In such an instance it is essential that the emergency brake be fully engaged to prevent movement of the vehicle while these operations are carried out. To assure that the emergency brake remains engaged when the vehicle is positioned on an incline, a parking lever associated with the emergency brake allows the operator to park the vehicle while other operations are conducted. Disconnecting the main contactors of the electrical controller will also prevent the tramming of the vehicle when positioned on a grade. However, with conventional shuttle cars a solenoid brake operating valve is connected to the main contactors and functions to release the brakes. When electrical power is restored by closing of the contacts within the controller to operate, for example the conveyor, the solenoid valve is energized to release the brakes. This presents a hazardous condition particularly when the vehicle is parked on a grade or ramp.

There is need to provide in a mine haulage vehicle a brake system in which the emergency brake is limited to emergency use only and not as a service brake. The operation of the emergency brake should preclude tramming of the vehicle so that any attempt to move the vehicle would require operational steps in addition to restoring the panic bar to its normal position.

SUMMARY OF THE INVENTION

In accordance with the present invention there is provided a brake actuator for the propelling means of a vehicle which includes a fluid pressure operated control means connected to the propelling means. The fluid pressure operated control means is arranged when subjected to fluid under pressure to be connected to the propelling means. A fluid actuated brake means is arranged to engage the propelling means and brake the vehicle. A fluid circuit supplies fluid under pressure from a source to a brake actuator valve, the fluid actuated braking means and the fluid pressure operated control means. The brake actuator valve is arranged in a brake disengaged position to supply the braking means with fluid under pressure and maintain the fluid actuated braking means in a disengaged position. The brake actuator is arranged in a brake engaged position to vent the fluid under pressure from the fluid actuated braking means and to vent the fluid under pressure from the pressure operated control means so that upon engagement of the fluid actuated brake means the fluid pressure operated control means is disengaged from the propelling means.

In one embodiment there is provided a brake system for a vehicle and a method of operation therefore that includes a prime mover and a propelling mechanism for the vehicle. A speed control device transmits power from the prime mover to the propelling mechanism. A closed circuit connects the prime mover through the speed control device to the propelling mechanism. A braking mechanism is operable to engage the propelling mechanism to prevent movement of the vehicle and to stop the vehicle in the event of loss of power to the propelling mechanism. A valve device actuates the braking mechanism. A switch mechanism connected to the speed control device actuates the speed control device to transmit power from the prime mover to the propelling mechanism. The switch mechanism is positioned in the circuit between the prime mover and the propelling mechanism. An operator controllable member connects the valve device of the braking mechanism with the switch mechanism. Actuation of the valve device through the operator controllable member actuates the braking mechanism to engage the propelling mechanism and simultaneously therewith the switch device is operated to terminate transmission of power to the propelling mechanism and stop the vehicle.

The braking mechanism valve device is normally maintained in a first position to permit transmission of power from the prime mover to the propelling mechanism. The valve device is moved to a second position upon actuation of the operator controllable member to maintain the switch device in an off position interrupting power transmission. This prevents operation of the speed control and propelling mechanisms and accordingly movement of the vehicle. The propelling mechanism is restored to operation permitting movement of the vehicle upon setting the braking mechanism valve device in the first position. This restores fluid pressure to release the braking mechanism. In order to restore tramming power to the propelling mechanism, however, the switch device must be actuated so that the speed control mechanism is operable to transmit power from the prime mover to the propelling mechanism. With this arrangement the braking mechanism is interlocked with the power transmission of the vehicle so that upon actuation the power transmission is terminated requiring restarting of the vehicle. Thus, the braking mechanism is effective as an emergency brake to prevent movement of the vehicle.

In another embodiment the circuit includes a pump which is operated by a motor to supply fluid under pressure to the closed hydraulic system that maintains a preselected fluid pressure for operation of fluid pressure operated control means or a switch mechanism. The switch mechanism includes a change speed clutch valve and a forward and reverse valve that are hydraulically actuated to, in turn, actuate the clutches of a multi-speed transmission that comprises the speed control mechanism. The multi-speed transmission is connected by an output shaft to the propelling mechanism that includes driven wheels. A braking mechanism for routine stopping and slowing the vehicle, such as a service brake, is operated by the vehicle operator to apply a braking force to the driven wheels. The emergency brake of the present invention receives a supply of fluid under pressure to maintain the emergency brake in a normally deactivated condition.

A pilot operated valve in the hydraulic circuit controls the flow of pressurized fluid from the pump to the change speed clutch valve and the forward and reverse valve. The pilot operated valve is interlocked with the valve device for actuating the emergency brake. The operator controllable device for actuating the valve device to apply the emergency brake includes a panic bar that when depressed by the operator removes fluid pressure from the pilot valve and the emergency brake. This operation results in application of the emergency brake and deactuation of the change speed clutch valve and the forward and reverse valve to interrupt transmission of power to the driven wheels. Thus, actuation of the panic bar not only applies the emergency brake but also interrupts the transmission of power to the driven wheels and prevents movement of the vehicle by merely restoring the panic bar to its normal position.

As illustrated in FIG. 2, operation of the panic bar terminates the flow of electric current to the controller that supplies electric power to the traction motors by opening the switch mechanism. Accordingly, the circuit to the electrical controller is opened and the flow of current to the traction motors is interrupted. Then to resume movement of the vehicle once the emergency braking mechanism has been actuated, it is necessary to first restore electrical power to the traction motors by manually restarting the motors at the controller and second move the emergency brake control valve lever from the second or park position to the first or run position.

By interlocking the application of the emergency brake with the operation of the multi-speed transmission and the supply of energizing current through the electrical controller to the traction motors, the emergency brake is restricted to emergency use only. With this arrangement the panic bar may not be operated for routine stopping of the vehicle. Operation of the panic bar interrupts transmission of power to the driven wheels requiring that the operator initiate a start-up procedure in order to restore tramming power to the vehicle.

The brake system of the present invention is adapted for use on automotive vehicles and is particularly adaptable for use with the brake system of a mine haulage vehicle, such as a "shuttle car" to transfer mined material in underground mines. With a shuttle car, the pump supplies pressurized fluid for the operation of other fluid actuated devices on the vehicle such as the cable reel, conveyor, power steering, and boom control. However, the hydraulic pressure required to carry out the operation of these devices is entirely independent of the hydraulic system for actuating the emergency brake and transmitting power through the speed control means to the propelling devices. Thus, actuation of the emergency brake and termination of power to the propelling devices does not interrupt operation of the auxiliary devices. The functions of operating the conveyor, maintaining the tension on the cable reel, and lifting or holding the boom may be carried out when the vehicle is maintained immovable by application of emergency brake and interruption of power to the driven wheels.

Accordingly, the principle object of the present invention is to provide a brake system for a vehicle, such as a mine haulage vehicle, that includes an emergency brake that is hydraulically actuated to bring the vehicle to a stop and prevent movement of the vehicle by interlocking actuation of the emergency brake with the transmission of power to the propelling mechanism so that actuation of the emergency brake terminates transmission of power to the propelling mechanism.

Another object of the present invention is to provide a brake system and method of operation therefore adapted for use on an automotive vehicle having an emergency brake that is actuated by an operator controllable member to stop the vehicle and terminate transmission of power to driven wheels necessitating restarting the vehicle once the emergency brake has been actuated so that the emergency brake be used for emergency use as opposed for routine stopping.

A further object of the present invention is to provide an emergency brake system for a mine haulage vehicle that includes an emergency brake operable to terminate power to the traction motors upon actuation requiring the motors to be restored in order to move the vehicle.

Another object of the present invention is to provide an emergency brake for a mine haulage vehicle in which operation of the emergency brake is interlocked with the transmission of power to the driven wheels of the vehicle so that the vehicle cannot be propelled once the emergency brakes are actuated.

These and other objects of the present invention will be more completely disclosed and described in the following specification, the accompanying drawings and the appended claims.

DESCRIPTION OF THE PREFERRED EMBODIMENTS

Figure 1:
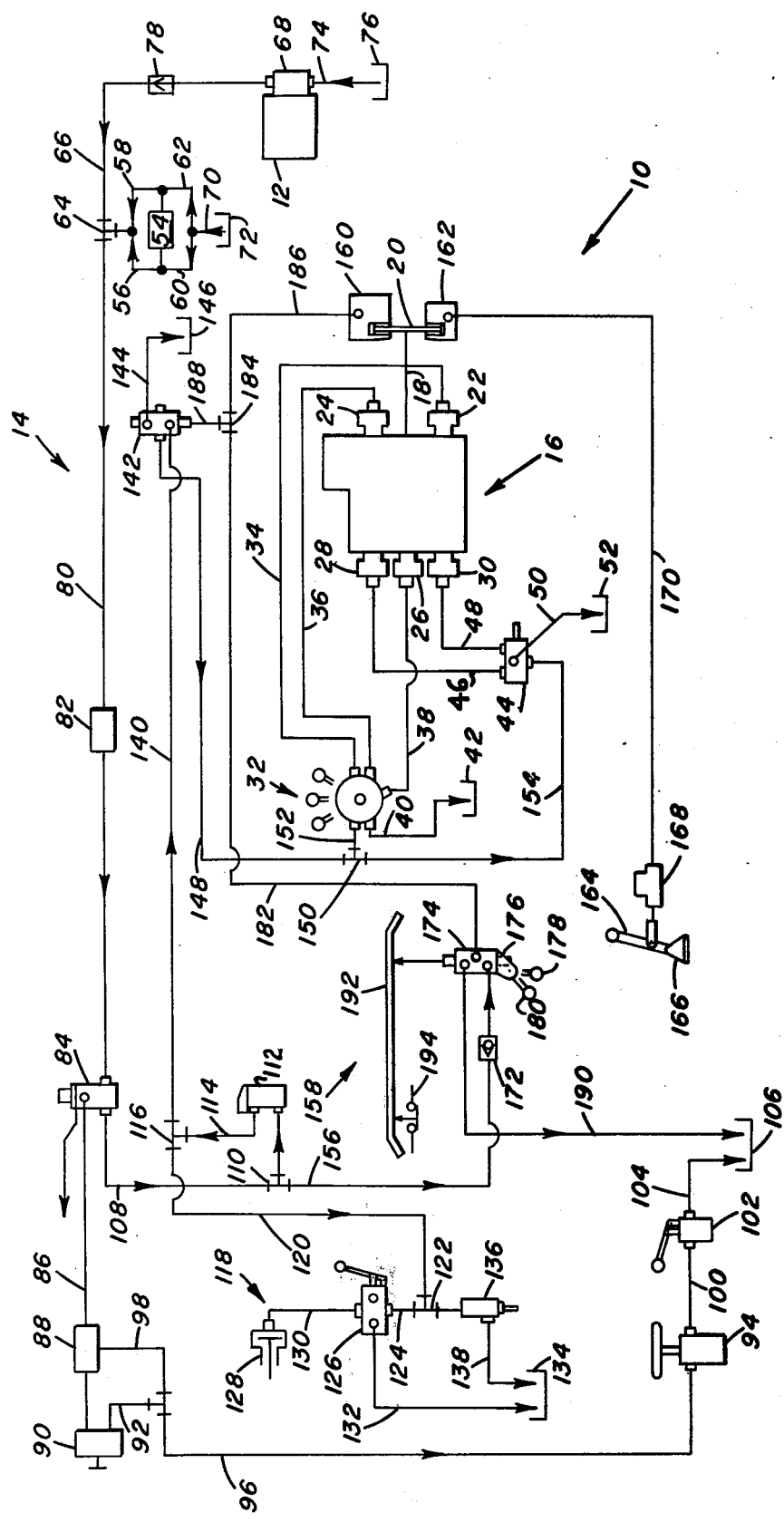
FIG. 1 is a diagrammatic view of the brake system of the present invention, illustrating the hydraulic circuitry of the brake system interlocked with the hydraulic transmission circuitry of a mine haulage vehicle.
Figure 2:
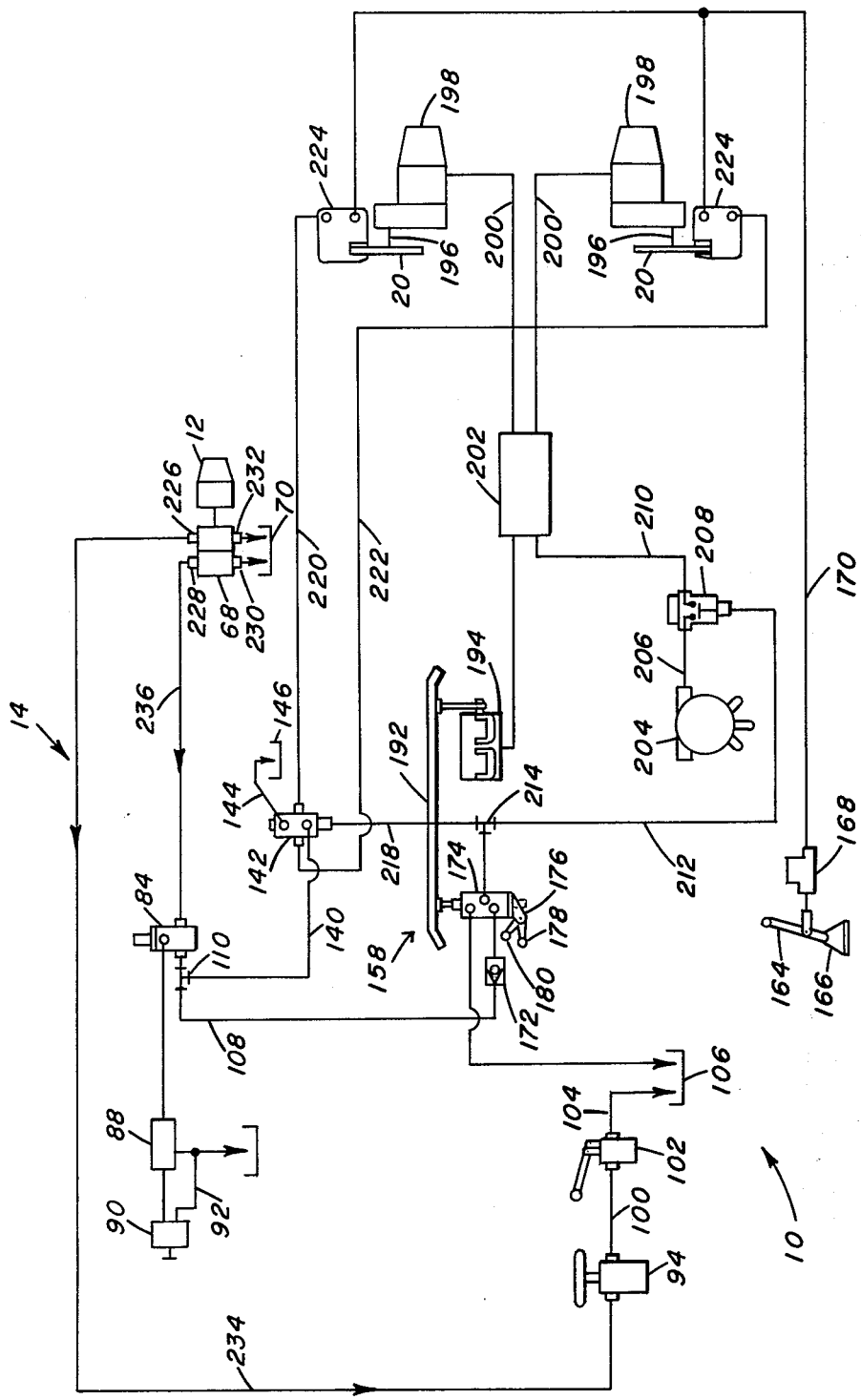
FIG. 2 is a diagrammatic view similar to FIG. 1 of the brake system of the present invention, illustrating the brake circuitry on a mine haulage vehicle interlocked with the electrical circuitry for actuating the vehicle traction motors.

Referring to the drawings in which like numerals refer to like parts in FIGS. 1 and 2, there is illustrated a brake system generally designated by the numeral 10 for applying a braking force to a vehicle. The features of the brake system as shown in FIGS. 1 and 2 may be embodied in a mine haulage vehicle, such as a "shuttle car", especially designed for use in transferring loose material in underground mines. While the features of the present invention are especially adapted for use with a shuttle car, they are also adapted to be used with automotive vehicles of other types. A complete description of a mine haulage vehicle to which the brake system of the present invention may be adapted, is illustrated in U.S. Pat. No. 2,754,015 which is incorporated herein by reference.

Referring to FIG. 1, there is illustrated an electric motor 12 of the A.C. or D.C. type and a continuous hydraulic circuit, generally designated by the numeral 14, for supplying hydraulic fluid under pressure from a hydraulic pump (later described) to the clutches of a multi-speed transmission 16. An output shaft 18 from the transmission 16 is drivingly connected in a conventionally known manner to the propelling means, such as driven wheel 20, of the powered vehicle. The multi-speed transmission 16 which may also be referred to as a fluid pressure operated control means includes selective speed controlling clutches 22, 24 and 26. Clutch 22 is the low speed clutch, clutch 24 the intermediate speed clutch and clutch 26 the high speed clutch. The multi-speed transmission 16 also includes a forward drive clutch 28 and a reverse drive clutch 30.

The low, intermediate and high speed clutches 22, 24 and 26 are controlled by a change speed clutch valve 32. Conduits 34, 36 and 38 connect the low speed clutch 22, intermediate speed clutch 24, and high speed clutch 26 respectively to the change speed clutch valve 32. A return conduit 40 connects the valve 32 to a reservoir 42. Associated with the forward drive clutch 28 and reverse drive clutch 30 is a forward and reverse valve 44 that is connected to the respective clutches by conduits 46 and 48. A return conduit 50 connects the forward and reverse valve 44 with a reservoir 52. Thus, the vehicle propelling devices may be driven selectively at different predetermined speeds by operation of the change speed clutch valve 32 and in either direction by operation of the forward and reverse valve 44 at any speed through the multi-speed transmission 16 which the electric motor 12 operates at a constant speed.

A pump 54 is associated with the transmission 16 in the continuous hydraulic circuit 14 and is operable to deliver fluid under pressure to the transmission 16. The pump 54 has a pair of conduits 56 and 58 connected to conduits 60 and 62. Both of the conduits 56 and 58 are connected by means of a T connection 64 to a conduit 66 that is connected to the output of a pump 68 which provides a source of fluid under pressure driven by a motor 12. Both of the conduits 60 and 62 are connected to a conduit 70 which extends into a reservoir 72. Since the multi-speed transmission 16 is reversible, the pump 54 is also reversible and operable in two directions. Depending on the direction of operation either the conduit 60 or 62 is the suction or low pressure conduit. Liquid is withdrawn from the reservoir 72 through conduit 70 through either conduit 60 or 62 to the pump and therefrom through conduit 58 or 56 respectively to the T connection 64 and main conduit 66.

Liquid under pressure is drawn through conduit 74 from a reservoir 76 by pump 68 and directed through check valve 78 in conduit 76 or from pump 54 to the T connection 64 to a conduit 80. The pressurized fluid flows through a filter 82 in conduit 80 to a relief valve 84 which limits the pressure from the pumps 54 and 68 to a preselected pressure. A conduit 86 connects the outlet side of relief valve 84 to a cable reel drive regulating valve 88 which is, in turn, connected to a cable reel motor 90 by means of conduit 92. The cable reel motor 90 propels the cable reel of the shuttle car in the desired direction. The outlet side of the cable reel motor 90 is connected to the inlet side of a power steering valve 94 by a conduit 96. A branch conduit 98 interconnects the bypass outlet side of the cable reel valve 88 with the conduit 96.

The outlet or return side of the steering valve 94 is connected by conduit 100 to a boom lift valve 102 that is operable to raise, lower or hold in a given position the boom or end frame of the shuttle car so that the end frame may pivot and vary the height of the discharge end of the endless flight conveyor that conveys the material within the material receiving compartment of the haulage vehicle in a longitudinal direction. A return conduit 104 connects the boom lift valve 102 to a reservoir 106. With the above described arrangement, the high pressures required to operate the cable reel, steer the vehicle, and operate the boom will not scavenge pressure from the brake system. Thus, the brake system remains operable while these auxiliary functions are performed on the vehicle.

The outlet of the relief valve 84 is connected by conduit 108 to T connection 110 that diverts fluid through a pressure relief valve 112 and conduit 114 to T connection 116. With this arrangement, pressurized fluid is directed through that portion of the hydraulic circuit 14 that supplies pressurized fluid to the fluid pressure operated control means such as the multi-speed transmission 16 and a circuit generally designated by the numeral 118 for operating the endless flight conveyor of the mine haulage vehicle.

Briefly, the hydraulic circuitry for operating the vehicle conveyor receives pressurized fluid through conduit 120 to a T connection 122. A conduit 124 connects one outlet of the T connection 122 to the inlet of a conveyor actuator valve 126 which is connected with the conveyor clutch 128 by conduit 130. A return conduit 132 connects the conveyor actuator valve 126 with a reservoir 134. The other outlet of the T connection 122 is connected to a pressure relief valve 136 and conduit 138 that also leaks to the reservoir 134.

Fluid at a reduced pressure, preferably at 125 p.s.i., is directed to a hydraulic circuitry of the transmission 16 from the T connection 116 into conduit 140 to the inlet of a pilot valve 142. The pilot valve has a first outlet connected by conduit 144 to a reservoir 146 and a second outlet through which pressurized fluid flows to conduit 148 to the multi-speed transmission 16. A T connection 150 diverts the fluid in a first direction through conduit 152 to the change speed clutch valve 32 and in a second direction through conduit 154 to the forward and reverse valve 44. In this manner the various transmission clutches 22, 24 26, 28 and 30 are actuated by either pump 54 or 68.

When the vehicle is not in motion and the motor 12 is energized, the pump 68 conducts fluid under pressure through the conduits 66, 80, 108, 114, 140, 148, 152 and 154 to the above enumerated fluid pressure operated devices. On the other hand, when the vehicle moves, the pump 54 conducts fluid in proportion to the velocity of the vehicle to the multi-speed transmission 16. Because the output of pump 54 is proportional to the speed of the vehicle as the vehicle speed increases, the demand for fluid in the system increases and the output of pump 54 also increases.

Pumps 54 and 68 also supply fluid under pressure through conduits 80 and 108 to T connection 110 and conduit 156 of an emergency brake system generally designated by the numeral 158. The emergency brake system 158 includes fluid actuated brake means such as emergency brake 160 that is operatively associated with the propelling means such as driven wheel 20 so that upon actuation, in a manner hereinafter described, the emergency brake 160 frictionally engages the wheel 20 to bring the vehicle to a stop or to prevent movement of the vehicle when it is first stopped by operation of a service brake 162. It is the function of the emergency brake 160 to prevent movement of the vehicle once it is stopped by application of the service brake 162. The emergency brake 160 is of the type illustrated and described in United States application, Ser. No. 641,941 entitled "Improved Brake Mechanism" which is incorporated herein by reference.

The service brake 162 operatively associated with the driven wheel 20 may be of the disc or drum type which when actuated provides a braking force to the moving vehicle. When the vehicle operator desires to slow the vehicle, the operator depresses an operator controllable member, such as brake pedal 164. The brake pedal 164 pivots about a fixed pivot 166. A master cylinder 168 is linked to the brake pedal 164 and is connected by a hydraulic line 170 to the inlet of service brake 162. Depressing the brake pedal 164 actuates the master cylinder 168 to provide pressurized fluid in line 170. The pressurized fluid is conducted to the service brake 162 to actuate the service brake to frictionally engage the driven wheel 20 to slow the vehicle or to bring the vehicle to a stop.

As stated hereinabove, the service brake 162 is operable to slow the vehicle while in motion and bring the vehicle to periodic stops during the haulage operation. However, the fluid actuated brake means, i.e., emergency brake 160 is intended for use in emergency situations only and to act as a parking brake when the vehicle is not in motion or is not intended to move while other functions on the vehicle are carried out, such as lifting of the boom and running the conveyor to unload the vehicle while positioned on an unloading ramp. The emergency brake 160 remains in a normally deactivated condition by the application of fluid pressure thereto at a preselected level which exceeds the system fluid pressure. For example, for a system of fluid pressure of 400 p.s.i., the emergency brake 160 is maintained at a fluid pressure of 600 p.s.i. to thereby assure that the brake remains disengaged when power is transmitted from either pump 54 or 68 through the multi-speed transmission 16 to the propelling means 20.

When deactivated, pressurized fluid is continuously supplied to the emergency brake 160 through the T connection 110 to the conduit 156. Fluid passes through conduit 156, and the direction of flow therein is controlled by directional valve 172. Conduit 156 is connected to an inlet of a brake actuator valve such as emergency brake valve 174 having a reset lever 176 operable in a first run position 178 and in a second park position 180. In the second park position 180 the emergency brake 160 is actuated, and the transmission of power to the propelling device 20 is terminated to prevent movement of the vehicle in a manner hereinafter described.

A first outlet of valve 174 is connected to conduit 182 that, in turn, connects to a T connection 184 for supplying the fluid under pressure through conduit 186 to emergency brake 160 and conduit 188 to the pilot valve 142. With this arrangement, the conduits 182, 186 and 188 remain fully pressurized when the emergency brake 160 is in a deactivated position. A second outlet of the emergency brake valve 174 is connected by return conduit 190 to the reservoir 106.

An operator controllable brake actuator, such as a panic bar 192, is mechanically connected to the emergency brake valve 174 and is located in the operator's compartment of the vehicle for convenient operation. The panic bar 192 when depressed actuates the emergency brake 160 in emergency situations only to bring the vehicle to a stop. It is not the function of the panic bar to be utilized for routine stopping and slowing of the vehicle. In the event the operator desires to bring the vehicle quickly to a stop, however, such as upon the occurence of an emergency situation application of a downward force to the panic bar 192 actuates the emergency brake valve 174 to remove the fluid pressure from conduits 182 and 186. Reducing the fluid pressure in conduit 182 leading to the pilot valve 142 actuates the valve 142 to divert the flow of pressurized fluid from the change speed clutch valve 32 and the forward and reverse valve 44 in order to deny power transmission to the driven wheel 20. Also reducing the fluid pressure in conduit 186 actuates the emergency brake 160. To this end depressing the panic bar 192 conducts the flow of pressurized fluid from valve 174 through return conduit 190 to reservoir 106.

When hydraulic pressure is removed from conduit 182 by operation of the panic bar 192, the pilot valve is actuated to divert flow from conduit 148 and the fluid actuated devices 32 and 44 to conduit 144 and reservoir 146. Preferably, the pilot valve 142 is actuated when the fluid pressure passing therethrough falls below a pressure in the range between about 450 to 500 p.s.i. Below this level the fluid actuated devices 32 and 44 are rendered inoperable so that the various transmission clutches 22, 24, 26, 28, and 30 are deenergized. In this manner the transmission 16 is disengaged for the transmission of power by the output shaft 18 to the driven wheel 20.

Simultaneously with terminating the flow of pressurized fluid to valves 32 and 44 the fluid pressure in conduit 186 is reduced to below the pressure for maintaining the emergency brake 160 in a deactivated condition. Therefore, for a reduction in operating pressure to emergency brake 160 below 400 p.s.i. the emergency brake is actuated to frictionally engage the wheel 20 and bring the vehicle to a stop. In addition to activating the emergency brake 160 and denying pressurized fluid to the fluid actuated devices 32 and 44 of the multi-speed transmission, the panic bar 192 places the valve lever 176 in the park position 180 to assure that the vehicle will not move. However, operation of the panic bar 192 does not deny fluid pressure to the fluid actuated valves 88, 94, 102 and 126 so that the functions of turning the cable reel and maintaining a preselected tension on the power cable, running the conveyor and lifting the boom while holding the boom in a given position may be carried out.

The hydraulic pressure required to control the above operations is entirely independent of the hydraulic system for controlling operation of the multi-speed transmission 16 and actuation of the emergency brake 160. This permits lifting of the boom and running the conveyor to unload while the vehicle remains stationary on an unloading ramp in which it is absolutely necessary the vehicle not move but the other operations of the vehicle be performed. This feature also permits testing of these operations during maintenance of the vehicle.

Not only is the panic bar 192 operable to interrupt the transmission of power through the multi-speed transmission 16 to the drive shaft 18 and the driven wheel 20, the panic bar 192 is also operable to remove the source of power to the electrically operable traction motors (not shown) of the vehicle. This is accomplished by interlocking the actuation of the emergency brake valve 174 by the panic bar 192 with the operation of a safe-off switch 194 that when in a normally closed position completes the electrical circuit through the electrical controller to the traction motor. Depressing the panic bar 192 operates the safe-off switch 194 to open the main contactors of the electrical controller and deny current to the traction motors. Thus, by interlocking operation of emergency brake 160 with operation of the electrical controller and traction motors the vehicle cannot be propelled in the event there should be inadequate pressure for brake release or loss thereof. The vehicle cannot be propelled until the emergency brake 160 is sufficiently pressurized to release the brakes from engagement with the driven wheel 20. It will be apparent that this feature of interlocking braking and tramming power prevents use of the emergency brake 160 as a service brake. Thus, the emergency brake will not receive significant wear and will be available when needed in emergency conditions.

Operation of the panic bar 192 places the reset lever 176 associated with the valve 174 in the part position 180. In the park position the emergency brake 160 is applied to the driven wheel 20, and the driven wheel 20 is denied tramming power. To prevent use of the panic bar for routine stopping, restoring the panic bar to its normal position as illustrated in FIG. 1 will not restore the fluid pressure in conduits 182 and 186 and release the emergency brake 160. The operator in order to restore the brake release circuit and close the circuit to the electrical controller for generation of tramming power requires the operator to intentionally move the lever 176 from the park position 180 to the run position 178. This operation to release the brakes and propel the vehicle requires energizing the main contactors of the electrical controller by pushing the safe-off switch 194 to complete the electric circuit from the electrically controller to the traction motors. However, even if the main contactors are energized to restore operation of the other devices on the vehicle, the lever 176 must be placed in the run position 178 to restore the flow of pressurized fluid to conduit 182 to release the emergency brake 160 and operate the change speed clutch valve 32 and the forward and reverse valve 44 of the multi-speed transmission 16.

A further embodiment of the present invention is illustrated in FIG. 2 in which like numerals of FIG. 1 refer to like parts of FIG. 1. The propelling means 20 are driven by shafts 196 that are drivingly connected to traction motors 198 that receive electrical power through conductors 200 from an electrical controller 202. The electrical controller 202 is energized by the on-off switch 194 that is linked to panic bar 192. A tram switch 204 provides directional control of the vehicle and is connected by conductor 206 to a fluid pressure operated control means such as a hydraulically actuated pressure switch 208. Conductor 210 connects the pressure switch 208 to the electrical controller 202. Fluid under pressure supplied to the inlet of pressure switch 208 through conduit 212 that is connected by a T connection 214 to brake valve 174 that is, in turn, connected to the outlet of emergency brake valve 174. The other outlet of T connection 214 is connected to conduit 218 that is, in turn, connected to an inlet of pilot valve 142. Conduits 220 and 222 extend from the outlets of pilot valve 142 and are connected to a combination emergency and service brakes 224 that include fluid actuated brake means and are operable to frictionally engage the driven wheels 20 to stop the vehicle.

In a manner similar to the hydraulic system illustrated in FIG. 1, motor 12 drives the pump 68 which in effect is a double pump having two outlets 226 and 228. The pump 68 has two suction sides connected by conduits 230 and 232 to reservoir 76. The high pressure outlet 226 is connected by a conduit 234 to the steering valve 94 and the boom lift valve 102. The flow from pressure outlet 228 supplies fluid through conduit 236 to the relief valve 84 for operation of the hydraulically actuated cable reel valve 88, the pilot valve 142, and panic bar valve 174 as above discussed.

With the brake actuator lever such as panic bar 192 maintained in a normal position as illustrated in FIG. 2, pressurized fluid is conducted from operated valve 174 to conduits 216 and 218 through pilot valve 142 to conduits 220 and 222 to maintain release of the emergency brakes of the brake assemblies 224. In addition with the panic bar 192 in normal position pressurized fluid is conducted to the T connection 214 and conduit 212 to the pressure switch 208. Preferably, the pressure switch 208 is operable at a pressure greater than the brake release pressure to maintain the contacts of the switch 208 closed and thereby complete the circuit from the tram switch 204 to the controller 202 and therefrom to the traction motors 198.

Actuation of the panic bar 192 removes the pressure within the hydraulic circuit to the pilot valve 142 and the pressure switch 208. When the hydraulic pressure in the circuit to the brakes 224 which includes fluid actuated brake means falls below the release pressure, the fluid actuated brake means are actuated to bring the vehicle to a stop. Simultaneously, reduction of pressure in the conduit 212 to the switch 208 below the brake release pressure, in the range between about 450 and 500 p.s.i., opens the circuit between the tram switch 204 and the controller 202 to thus prevent operation of the traction motors 198 and forward movement of the vehicle.

Simultaneously, with the above operation to bring the vehicle to a stop, the safe-off switch 194 is actuated by the panic bar 192 to open the electrical circuit to the controller 202 and terminate operation of the traction motors 198. Thus, by interlocking the actuation of the fluid actuated means with the supply of power from the electrical controller to the traction motors 198 through the panic bar 192, the vehicle is stopped and transmission of propelling power to the driven wheels 20 is denied. This assures that merely restoring hydraulic pressure to the circuit of the emergency brakes to release the emergency brakes will not restore the electrical circuitry for operation of the traction motors 198.

As with the arrangement for the brake system illustrated in FIG. 1, actuation of the brake actuator lever 192 moves the brake reset lever 176 from the run position 178 to the park position 180. To restore propelling power to the traction motors 198, the lever 176 must be manually set in the run position 178. Thereafter, the safe-off switch 194 must be restored to a safe position so that when the conduit 212 is against pressurized to actuate valve 208 and close the circuit between the tram switch 204 and the controller 202, electrical power is supplied to the traction motors 198 for driving the shafts 196 and propelling the wheels 20.

Thus, it will be apparent by the embodiments illustrated in FIGS. 1 and 2 a brake system is provided that insures emergency stopping of the vehicle by application of emergency brakes by an operator controlled brake actuator lever such as, the panic bar 192, which also serves to terminate the transmission of power to the propelling devices. By interlocking operation of the means for transmitting power to the propelling devices and the emergency brakes, release of the emergency brakes will not restore the vehicle to movement. In addition, it is further required that the source of power for the traction motors be restored by manually restarting the traction motors. With this arrangement, the emergency brakes are effective to hold the vehicle on grades and preclude tramming of the vehicle until the brake release circuit is restored. Further, it is the feature of preventing movement of the vehicle when the emergency brakes are applied that assures that the emergency brakes will not be used when the vehicle is in motion. Thus, the emergency brakes will be available when needed and be protected from use as a service brake. Furthermore, it assures operation of other vehicle functions when the vehicle is intended to remain stationary or during maintenance of the vehicle.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A brake actuator for a vehicle comprising,
propelling means for said vehicle,
fluid pressure operated control means connected to said propelling means, said fluid pressure operated control means arranged when subjected to fluid under pressure to be connected to said propelling means,
fluid actuated brake means for engaging said propelling means and braking said vehicle,
a source of fluid under pressure,
a brake actuator valve,
a fluid circuit for controlling the flow of fluid under pressure between said source of fluid under pressure to said brake actuator valve, fluid actuated braking means, and said fluid pressure operated control means,
said brake actuator valve arranged in a brake disengaged position to supply said fluid actuated braking means with fluid under pressure from said source and maintain said fluid actuated braking means in a disengaged position,
said brake actuator valve arranged in a brake engaged position to vent said fluid under pressure from said fluid actuated braking means and vent said fluid under pressure from said pressure operated control means so that upon engagement of said fluid actuated brake means said fluid pressure operated control means is disengaged from said propelling means,
a brake actuator lever connected to said brake actuator valve, said brake actuator lever arranged to manually actuate said brake actuator valve and vent fluid under pressure from said fluid actuated braking means and said fluid pressure operated control means, and
a brake reset lever connected to said brake actuator valve, said brake reset lever movable to a brake engaged position upon engagement of said fluid actuated braking means to maintain said brake in an engaged position upon release of said brake actuator lever.

2. A brake actuator for a vehicle as set forth in claim 1 in which,
said brake reset lever is manually movable to a brake engaged position upon release of said brake actuator lever to thereby supply fluid under pressure to both said fluid actuated brake means and said fluid pressure operated control means.

3. A brake actuator for a vehicle as set forth in claim 1 which includes,
means to both lock said fluid actuated braking means in a brake engaged position and said fluid pressure operated control means in a disengaged position from said propelling means.

4. A brake actuator for a vehicle as set forth in claim 1 which includes,
means to maintain said fluid pressure operated control means disengaged from said propelling means while fluid actuated braking means engages said propelling means.

5. A brake actuator for a vehicle comprising,
propelling means for said vehicle,
fluid pressure operated control means connected to said propelling means, said fluid pressure operated control means arranged when subjected to fluid under pressure to be connected to said propelling means, fluid actuated brake means for engaging said propelling means and braking said vehicle,
a source of fluid under pressure,
a brake actuator valve having an inlet, a first outlet and a second outlet,
a first conduit connecting said source of fluid under pressure with said brake actuator valve inlet,
a second conduit connecting said brake actuator valve first outlet to said fluid actuated brake means,
a pilot operated valve having a first inlet, a second inlet, a first outlet and a second outlet,
a third conduit connecting said source of fluid under pressure with said pilot operated valve,
a fourth conduit connecting said pilot operated valve first outlet with said fluid pressure operated control means,
said brake actuator valve arranged in a brake disengaged position to connect said first conduit and said second conduit and thereby subject said fluid actuated braking means to fluid under pressure from said source and maintain said fluid actuated braking means in a disengaged position,
said brake actuator valve arranged in a brake engaged position to vent said fluid under pressure from said second conduit through said brake actuator valve second outlet,
a branch conduit connecting said second conduit to said pilot operated valve second inlet and arranged to supply fluid under pressure from said second conduit to said pressure operated valve to open said pressure operated valve and thereby supply fluid under pressure to said fluid pressure operated control means through said pilot operated valve, and
said pilot operated valve arranged in the absence of fluid under pressure in said second conduit to vent said fluid under pressure from said fourth conduit through said second outlet and disengage said fluid pressure operated control means so that upon engagement of said fluid actuated brake means said fluid pressure operated control means is disengaged from said propelling means.

6. A method of applying a braking force to the propelling means of a vehicle and disengaging a fluid pressure operated control means from the propelling means comprising,
supplying fluid under pressure in a circuit to a fluid actuated brake means and to a fluid pressure operated control means,
subjecting said fluid actuated brake means to fluid under pressure from said circuit to disengage said fluid actuated brake means from said propelling means,
subjecting said fluid pressure operated control means to fluid under pressure from said circuit to engage said fluid pressure operated control means to said propelling means,
manually actuating a brake actuator lever to thereby actuate a brake actuator valve in said circuit to reduce the pressure of said fluid supplied to said fluid actuated brake means and said fluid pressure operated control means to thereby engage said propelling means with said fluid actuated brake means and disengage said fluid pressure operated control means from said propelling means,
actuating a brake reset lever connected to said brake actuator valve to lock both said fluid actuated braking means in a brake engaged position and said fluid pressure operated control means in a disengaged position from said propelling means,
maintaining said brake reset lever in an actuated brake engaged position upon release of said brake actuator lever to maintain said fluid actuated brake means in an engaged position, and
manually releasing said brake reset lever to both disengage said fluid actuated brake means from said propelling means and engage said fluid pressure operated control means to said propelling means.

* * * * *